(12) United States Patent
Delmas

(10) Patent No.: US 11,624,152 B2
(45) Date of Patent: Apr. 11, 2023

(54) LOW ENERGY PRODUCTION PROCESS FOR PRODUCING PAPER PULP FROM LIGNOCELLULOSIC BIOMASS

(71) Applicant: BIOEB, Auzeville-Tolosane (FR)

(72) Inventor: Michel Delmas, Auzeville-Tolosane (FR)

(73) Assignee: Société Bioeb, Auzeville-Tolosane (FR)

( * ) Notice: Subject to any disclaimer, the term of this patent is extended or adjusted under 35 U.S.C. 154(b) by 75 days.

(21) Appl. No.: 16/969,700

(22) PCT Filed: Dec. 13, 2018

(86) PCT No.: PCT/EP2018/084685
§ 371 (c)(1),
(2) Date: Aug. 13, 2020

(87) PCT Pub. No.: WO2019/158247
PCT Pub. Date: Aug. 22, 2019

(65) Prior Publication Data
US 2021/0002824 A1 Jan. 7, 2021

(30) Foreign Application Priority Data
Feb. 16, 2018 (EP) .................................... 18157075

(51) Int. Cl.
| | | |
|---|---|---|
| *D21C 3/00* | (2006.01) | |
| *D21C 9/02* | (2006.01) | |
| *D21C 11/00* | (2006.01) | |
| *C08H 7/00* | (2011.01) | |
| *D21C 9/18* | (2006.01) | |
| *D21H 11/02* | (2006.01) | |
| *C08B 37/00* | (2006.01) | |
| *C10J 3/72* | (2006.01) | |
| *D21C 3/20* | (2006.01) | |
| *D21C 3/04* | (2006.01) | |

(52) U.S. Cl.
CPC .......... *D21C 3/003* (2013.01); *C08B 37/0057* (2013.01); *C08H 6/00* (2013.01); *C10J 3/72* (2013.01); *D21C 3/04* (2013.01); *D21C 3/20* (2013.01); *D21C 9/02* (2013.01); *D21C 9/18* (2013.01); *D21C 11/0007* (2013.01); *D21H 11/02* (2013.01); *C10J 2300/092* (2013.01)

(58) Field of Classification Search
CPC . D21C 3/20; D21C 2/003; D21C 3/04; D21C 3/003
See application file for complete search history.

(56) References Cited

U.S. PATENT DOCUMENTS

| | | |
|---|---|---|
| 7,402,224 B1 | 7/2008 | Avignon et al. |
| 2010/0285553 A1 | 11/2010 | Delmas et al. |
| 2016/0369033 A1 | 12/2016 | Delmas et al. |

FOREIGN PATENT DOCUMENTS

| | | |
|---|---|---|
| EP | 2336195 A1 | 6/2011 |
| WO | 2009092749 A1 | 7/2009 |

OTHER PUBLICATIONS

El-Sakhawy et al., Organosolv Pulping, 1995, Cellulose chemistry and Technology. (Year: 1995).*
Dong et al., Kinetic modeling of atmospheric formic acid pretreatment of wheat straw with "potential degree of reaction" models, 2015, RSC Adv, 5, 20992. (Year: 2015).*
handymath.com, The complete Aqueous Acid Solutions Density-Concentration Calculator from Perry's Chemical Engineers' Handbook, by PERRY, downloaded online May 20, 2022 (Year: 2022).*
TAPPI, TAPPI T 236 om-99, 1999. (Year: 1999).*
International Search Report; priority document.
Yu et al., "Fractionation of the Main Components of Corn Stover by Formic Acid and Enzymatic Saccharification of Solid Residue" Industrial Crops and Products, vol. 50, Oct. 2013, pp. 750-757.
Zhang et al., "Organosoly Pretreatment of Plant Biomass for Enhanced Enzymatic Saccharification" vol. 18, 2016, pp. 360-381.

* cited by examiner

*Primary Examiner* — Anthony Calandra
(74) *Attorney, Agent, or Firm* — Greer, Burns & Crain, Ltd.

(57) ABSTRACT

A low energy production process for producing paper pulp from lignocellulosic biomass, the process comprising the following successive steps: a) extracting lignins and hemicellulose from lignocellulosic biomass by putting at least one solid lignocellulosic raw material in the presence of a mixture, composed only of water and of formic acid, at atmospheric pressure and under controlled conditions of reaction temperature between ambient temperature and the reflux temperature of the mixture at atmospheric pressure, preferably between 80° C. and 100° C., with a weight ratio of the at least one solid lignocellulosic raw material/liquid mixture comprised between 1/1 and ⅕, and for a determined period of time of reaction; and b) separating, at atmospheric pressure and at the reaction temperature, a solid fraction, constituting raw paper pulp, from an organic phase containing in solution at least the starting formic acid and water mixture, solubilized monomeric and polymeric sugars, lignins.

13 Claims, No Drawings

LOW ENERGY PRODUCTION PROCESS FOR PRODUCING PAPER PULP FROM LIGNOCELLULOSIC BIOMASS

CROSS-REFERENCES TO RELATED APPLICATIONS

This application claims the benefit of the International Application No. PCT/EP2018/084685, filed on Dec. 13, 2018, and of the European patent application No. 18157075.5 filed on Feb. 16, 2018, the entire disclosures of which are incorporated herein by way of reference.

FIELD OF THE INVENTION

The invention relates to a low energy production process for the production of paper pulp, starting from a lignocellulosic biomass.

BACKGROUND OF THE INVENTION

Lignocellulosic vegetable raw material for use with an extraction/production process for producing cellulose/paper pulp, is, for example, available in mass when one considers the lignocellulosic residues in logging and in the production of palm or palm trees, or the production of rice straw and cereal straw at large, or the bagasse in the sugar industry.

In these two cases, a very abundant raw material is available for carrying out the process according to the invention which, to date, finds no profitable industrial use and under environmentally acceptable conditions for the production of energy, and, for example, for the production "in situ" of electricity.

Lignocellulosic vegetable raw material for use with an extraction/production process for producing cellulose/paper pulp, is, for example, also available in mass from wood.

In a manufacturing facility, wood chips or other plant fiber sources are converted into a thick fiberboard which can be shipped to a paper mill for further processing when the pulp mill and the paper mill are not integrated. Pulp can be manufactured using mechanical, semi-chemical or fully chemical methods (Kraft and sulfite processes). The finished product may be either bleached or non-bleached, depending on the customer requirements.

Wood and other plant materials used to make pulp contain three main components (Apart from water): cellulose fibers (Desired for papermaking), lignin (A phenolic oligomer that contributes to bind the cellulose fibers together) and hemicelluloses, (Shorter branched carbohydrate polymers). The aim of pulping is to break down the bulk structure of the fibers source, be it chips, stems or other plant parts, into the constituent fibers.

Chemical pulping achieves this by degrading the lignin and hemicelluloses into small, water-soluble molecules which can be washed away from the cellulose fibers without depolymerizing the cellulose fibers. The chemical and thermal treatments reduce the amount of energy subsequently required by the mechanical treatment, and also reduce the amount of strength loss suffered by the fibers.

The dominant industrial chemical extraction process for producing paper pulp from lignocellulosic vegetable raw material is the "Kraft" process, with the "sulfite process" in second.

The Kraft process (Also known as Kraft pulping or sulfate process) is a process for conversion of wood into wood pulp, which consists of almost pure cellulose fibers, and which is the main component of paper. The Kraft process entails treatment of wood chips with a hot mixture of water, sodium hydroxide (NaOH), and sodium sulfide (Na2S), known as the "white liquor", that breaks the bonds that link lignin, hemicellulose, and cellulose. The Kraft process technology entails several steps, both mechanical and chemical.

During the so-called "cooking step", wood chips are cooked in pressurized vessels called digesters. Typically, delignification requires several hours at 170° C. to 176° C. Under these conditions lignin and hemicellulose degrade to give fragments that are soluble in the strongly basic liquid. The solid pulp (About 50% by weight of the dry wood chips) is collected and washed. At this point the pulp is known as brown stock because of its color. The combined liquids, known as "black liquor", contain lignin fragments, carbohydrates from the breakdown of hemicellulose, sodium carbonate, sodium sulfate and other inorganic salts.

Various byproducts in the Kraft process containing hydrogen sulfide, methyl mercaptan, dimethyl sulfide, dimethyl disulfide, and other volatile sulfur compounds are the cause of the malodorous air emissions characteristic for pulp mills utilizing the Kraft process.

Thus, in some situations, the Kraft process can release odorous products and in some situations produce substantial liquid wastes.

In addition, the Kraft process consumes significant amounts of energy, also including energy consumed during additional steps for screening, washing and bleaching the paper pulp.

"Organosolv" processes have also been proposed among industrial papermaking processes. Organosolv processes are a pulping technique that uses an organic solvent to solubilize lignin and hemicellulose. It has been considered in the context of both pulp and paper manufacture and bio-refining for subsequent conversion of cellulose to fuel ethanol. The process was invented as an environmentally benign alternative to Kraft pulping.

Organosolv processes have several advantages when compared to other popular methods such as Kraft or sulfite pulping. In particular, the ability to obtain relatively high quality lignin adds value to a process stream otherwise considered as waste. Organosolv processes solvents are easily recovered by distillation, leading to less water pollution and elimination of the odor usually associated with Kraft pulping.

Organosolv processes pulpings involve contacting a lignocellulosic feedstock with an aqueous organic solvent at temperatures ranging, for example, from 140° C. to 220° C. Solvents used include acetone, methanol, ethanol, butanol, ethylene glycol, formic acid, and acetic acid. The concentration of solvent in water ranges from 40 to 80%. Higher boiling solvents have the advantage of a lower process pressure. This is weighed against the more difficult solvent recovery by distillation.

For pulp production, pulping with ethanol-water solutions gives a lignin free pulp yield 4-4.5% higher than that of Kraft pulp. The commonly used solvents acetone and ethanol have been examined with respect to pulp properties. The pulping of wheat straw with 40% mixtures of acetone or ethanol with water requires 60 minutes at 180° C. to give pulp with acceptable properties.

Organic solvents are almost always used as a mixture with water for process considerations such as reducing the vapor pressure and lowering the pH in order to also solubilized hemicellulose.

Various Organosolv processes have been proposed (Alcell process, CIMV process, Chempolis Process, etc.) that all requires a significant amount of energy due to the reaction/ cooking temperature that is always above 100° C. and/or due to the necessity of ensuring a high reaction pressure. They also necessitate to perform recycling of the solvents.

Thus, there is a global need for a process and a pathway for the treatment of lignocellulosic biomass, and, in particular, wastes from agricultural production and from the forest industry, which makes it possible to produce high quality paper pulp, and thereafter high quality paper, necessitating as low energy as possible.

SUMMARY OF THE INVENTION

The invention proposes a low energy production process for producing paper pulp from lignocellulosic biomass, this process comprising the following successive steps:

a) extracting lignins and hemicellulose from lignocellulosic biomass by putting at least one solid lignocellulosic raw material in the presence of a mixture, composed only of water and of formic acid, at atmospheric pressure and under controlled conditions of reaction temperature between ambient temperature and the reflux temperature of the mixture at atmospheric pressure, preferably between 80° C. and 100° C., with a weight ratio of the at least one solid lignocellulosic raw material/liquid mixture comprised between 1/1 and 1/15, and for a determined period of time of reaction (Also called cooking period);

b) separating, at atmospheric pressure and at the reaction temperature, a solid fraction, constituting raw paper pulp, from an organic phase containing in solution at least the starting formic acid and water mixture, solubilized monomeric and polymeric sugars, lignins; and According to other aspects of the process:

it comprises an additional step consisting in c) washing the raw paper pulp;

the raw paper pulp is washed successively in two steps with:

c1) a solution composed of water and of formic acid with a concentration of formic acid in the solution between 80% and 100%, at ambient temperature; and c2) with hot water between 40° C. and 60° C.;

the concentration of formic acid in the mixture is between 50% and 100%, preferably between 80% and 90%;

the weight ratio of the at least one solid lignocellulosic raw material/liquid mixture is comprised between 1/4 and 1/6;

the reaction temperature is equal to 85° C.;

the organic phase contains in solution at least the starting formic acid and water mixture, solubilized monomeric and polymeric sugars, lignins, and acetic acid derived from the plant material;

the b) separation step is a centrifugation step or a filtration step, at atmospheric pressure and at the reaction temperature;

a centrifugation step at ambient temperature is performed between the first washing step c1) with a solution composed of water and of formic acid, and the second washing step c2) with hot water;

a centrifugation step is performed after the second washing step c2) with hot water;

the determined period of time of reaction depends on the measured or determined Kappa number of the paper pulp;

the determined period of time of reaction is stopped when the Kappa number of the paper pulp reaches a stabilized value depending on the nature of the at least one lignocellulosic raw material;

the process comprises a step consisting in regularly measuring or determining the Kappa number of the paper pulp during the determined period of time of reaction for identifying the stabilization of the Kappa number of the paper pulp;

the step for regularly measuring or determining the Kappa number of the paper pulp consists in measuring or determining the Kappa number every ten minutes;

the determined period of time of reaction is stopped when the Kappa number of the paper pulp is stabilized after at least three consecutive measurements or determination of the Kappa number of the paper pulp.

DETAILED DESCRIPTION OF THE PREFERRED EMBODIMENTS

All biomass contains cellulose, hemicellulose and lignin in varying percentages, along with inorganic components which are the source of ash. Cellulose is a straight-chain polymer comprising anhydroglucopyranose joined with ether bonds. Hemicellulose is an amorphous polysaccharide containing sugar units which are branched and have varied sugar types. Lignin is the most complex constituent and is a polymer structure of phenylpropane units.

The most prominent constituent of biomass is lignocellulose, which consists of the non-starch, fibrous part of plant material. Cellulose or paper pulp, hemicellulose and lignin are the three main elements of lignocellulosic biomass.

First Example

An example of extraction according to the invention of raw paper pulp from a biomass Lignocellulosic Raw Material (LRM) using a mixture of water and formic acid (HCOOH) at low temperature and at atmospheric pressure is as follows.

The first step consisted in preparing a mixture or solution of formic acid in water using a ratio in weight of 85% of formic acid and 15% of water, i.e., a concentration of formic acid equal to 85%.

In a second step, 30 grams of a dried sample of lignocellulosic feedstock (LRM) and 270 grams of the liquid mixture of formic acid in water have been introduced in a 500 milliliters glass reactor.

The solid/liquid ratio (i.e., Lignocellulosic feedstock/Mixture of acid and water) mass ratio (ratio in weight) was, for example, equal to 1/9.

In order to increase the contact surface between liquid and solid, the lignocellulosic raw material sample can be crushed.

At the ambient atmospheric pressure and using an oil bath, the mixture of the acid/water solution and of the biomass lignocellulosic raw material sample is heated at a temperature between 80° C. and 90° C.

This mixture is thus stirred using a mechanical stirrer with an Inox anchor to have a homogenous temperature.

Using a thermometer, the temperature has been stabilized at 85° C.

At this stabilized temperature, the reaction started and has been maintained for 4 hours.

Because working at a low temperature under 100° C., this extraction step is a very low energy consuming step.

At the end of this period of time of reaction, the content of the reactor has been cooled to the ambient temperature and it contains a solid fraction and a liquid fraction.

The content of the reactor has then been filtered to separate the raw solid cellulose or raw paper pulp from the liquid phase or fraction (First organic liquor).

The separated cellulose has been washed with formic acid and then pressed and filtered to remove—in a liquid form—another portion of the of the liquid phase or fraction (Second organic liquor).

First and second organic liquors have then been mixed together to obtain a main organic liquor.

This primary liquid fraction has further been concentrated under vacuum, preferably with a heating thereof between 40° C. and 50° C., at a pressure of 100 milliBar.

This concentration phase has been maintained until the moment where the dry matter content was about 50% to 60% in weight.

At this stage, all parts of the formic acid contained in the first organic liquor are recovered and separated to obtain an intermediate liquid fraction.

It appears that some other organics acids, such as acetic acid (CH3CO2H), could be generated or produced in very small amounts during the extraction step starting with a mixture of formic acid and water.

In order separate or "extract" the lignins from the hemicellulose fraction in the intermediate liquid fraction, warm water has been added to the intermediate liquid fraction for reaching a liquid/solid mass ratio, for example equal to 4/1.

With a view to enhancing the separation of the lignins from the hemicellulose fraction, for example only, a high performance rotor/stator disperser has been used during a period of dispersion comprised between 2 and 3 minutes at a rotational speed greater than 15000 revolutions/minute.

At the end of this dispersion step, it has been processed with a filtration step or a centrifugation step to separate the lignins from the hemicellulose fraction and to obtain a residual liquid fraction.

The separated lignins have then been washed with warm water until a neutral pH of the filtrate has been reached.

The lignins have then been crushed and dried until reaching 94% of dry matter in weight, the drying temperature being not greater than 40° C.

Second Example

A second example of extraction according to the invention of raw paper pulp from a biomass Lignocellulosic Raw Material (LRM) using a mixture of water and formic acid (HCOOH) at low temperature and at atmospheric pressure is as follows.

The first step consisted in preparing a mixture or solution of formic acid in water using a ratio in weight of 85% of formic acid and 15% of water, i.e., a concentration of formic acid equal to 85%.

In a second step, an amount of a dried sample of lignocellulosic feedstock (LRM) and an amount of the liquid mixture of formic acid in water have been introduced in a glass reactor.

The solid/liquid ratio (i.e., Lignocellulosic feedstock/Mixture of acid and water) mass ratio (ratio in weight) was, for example, from ¼ to ⅙, in order to have a minimum of contact between the acid mixture and the biomass sample.

In order to increase the contact surface between liquid and solid, the lignocellulosic raw material sample can be crushed.

At the ambient atmospheric pressure and using an oil bath, the mixture of the acid/water solution and of the biomass lignocellulosic raw material sample is heated at a temperature between 80° C. and 90° C.

This mixture is thus stirred using a mechanical stirrer with an Inox anchor to have a homogenous temperature.

Using a thermometer, the temperature has been stabilized at 85° C.

At this stabilized temperature, the reaction started and has been maintained from 2 to 4 hours.

A Kappa index analysis of a sample of raw cellulose (Raw paper pulp) is conducted on a regular basis, for example using the TAPPI standard method T236 om-99.

For example, the Kappa index analysis is conducted at least every 30 minutes after the two first hours of reaction.

The Kappa index analysis might be conducted every 10 minutes after the two first hours of reaction.

When the Kappa index reaches a constant value, i.e., when its value is stabilized, the reaction (i.e., the so-called cooking period of time) is stopped.

At this stage, the content is processed for separating the raw cellulose (Solid phase or solid fraction) from the so-called first organic liquor (Liquid phase or liquid fraction).

This separation is obtained by filtration or centrifugation.

Thereafter, the separated raw cellulose is washed with a solution composed of water and of formic acid at a concentration of formic acid between 85% and 99%.

Thereafter, the washed cellulose is processed for removing the residual second organic liquor, by pressing and filtering, or preferably by centrifugation.

Additionally, the obtained cellulose can be washed in an additional step using only water at a temperature from 40° C. to 60° C.

After this "hot" water additional washing step, the cellulose or paper pulp can be again centrifuged.

After washing, the pH of the paper pulp is close to neutral.

The first and second organic liquors previously obtained are mixed together in a single main organic liquor.

This main organic liquor is then concentrated under vacuum. The media has been heated at a temperature less than 50° C. at a 100 mBar pressure. The concentration step is maintained until obtaining organic syrup, the dry matter content of the syrup being about 50% to 60% in weight.

In order to separate or "extract" the lignins from the hemicellulose fraction in the intermediate liquid fraction, warm water has been added to the intermediate liquid fraction for reaching a liquid/solid mass ratio, for example equal to at least about 2/1.

With a view to enhancing the separation of the lignins from the hemicellulose fraction, for example only, a high performance rotor/stator disperser has been used during a period of dispersion comprised between 2 and 3 minutes at a rotational speed greater than 15000 rounds/minute.

At the end of this dispersion step, it has been processed with a filtration step to separate the lignins from the hemicellulose fraction and to obtain a residual liquid fraction.

The separated lignins have then been washed with warm water until a neutral pH of the filtrate has been reached.

The lignins have then been crushed and dried until reaching at least 90% of dry matter in weight (Preferably 95%), the drying temperature being not greater than 40° C.

The re-condensed formic acid/water previously obtained can be reused, after a rectification step to reach the preferred 85% concentration, for another extraction of biomass or for washing the raw cellulose or raw paper pulp.

According to this second example, depending on the nature of the raw feedstock values, corresponding values have been obtained as follows.

| | Weight of dried product (Dry matter content of the product) | |
|---|---|---|
| | Rice straw | Birch wood |
| Feedstock (g) | 44.7 (88%) | 57.8 (95%) |
| Lignin extracted (g) | 7.5 (96%) | 10.9 (97%) |
| Hemicelluloses extracted (g) | 12.7 (62%) | 15.7 (62%) |
| Mass yield of extracted product | 45% | 46% |
| Kappa index of cellulose (Tappi T236) | 20-22 | 28-30 |
| Residual index of cellulose (Tappi T236) | 4%-5% | 5%-6% |

Because working at a low temperature under 100° C., this extraction step is a very low energy consuming step.

For example, an industrial plant using the process according to the invention, for one Ton (1T) of dry pulp, has an average energy consumption around 2 MWh (+/−20%), to be compared with the average energy consumption equal to 5 to 6 MWh for a non-integrated plant using the Kraft process.

The process according to the invention can be industrially implemented using a batch technique for the extraction step, also including stirring of the content of each batch.

This is advantageous when compared with diffusion techniques that imply long and energy consuming extraction periods.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A low energy production process for producing paper pulp from lignocellulosic biomass, said process comprising the following successive steps:
   a) extracting lignins and hemicellulose from lignocellulosic biomass by putting at least one solid lignocellulosic raw material in a presence of a mixture, composed only of water and of formic acid, at atmospheric pressure and under controlled conditions of reaction temperature between ambient temperature and a reflux temperature of the mixture at atmospheric pressure with a weight ratio of said at least one solid lignocellulosic raw material/liquid mixture comprised between 1/1 and 1/15, and for a determined period of time of reaction depending on a Kappa number of the raw paper pulp;
   b) separating, at atmospheric pressure and at said reaction temperature, a solid fraction, constituting raw paper pulp, from an organic phase containing in solution at least the starting formic acid and water mixture, solubilized monomeric and polymeric sugars, lignins; and, washing said raw paper pulp successively in two steps with:
   c1) a solution composed of water and of formic acid with a concentration of formic acid in said solution between 80% and 100%, at ambient temperature; and
   c2) with hot water between 40° C. and 60° C., and wherein a centrifugation step at ambient temperature is performed between said first washing step c1) with a solution composed of water and of formic acid, and said second washing step c2) with hot water.

2. The low energy paper pulp production process according to claim 1, wherein a concentration of formic acid in said mixture is between 50% and 100.

3. The low energy paper pulp production process according to claim 2, wherein the concentration of formic acid in said mixture is between 80% and 90%.

4. The low energy paper pulp production process according to claim 1, wherein the weight ratio of said at least one solid lignocellulosic raw material/liquid mixture is comprised between 1/4 and 1/6.

5. The low energy paper pulp production process according to claim 1, wherein said organic phase contains in solution at least the starting formic acid and water mixture, solubilized monomeric and polymeric sugars, lignins, and acetic acid derived from the lignocellulosic biomass.

6. The low energy paper pulp production process according to claim 1, wherein said b) separation step is a centrifugation step or a filtration step, at atmospheric pressure and at said reaction temperature.

7. The low energy paper pulp production process according to claim 1, wherein said determined period of time of reaction is stopped when the Kappa number of the raw paper pulp reaches a stabilized value depending on a nature of the at least one lignocellulosic raw material.

8. The low energy paper pulp production process according to claim 7, which comprises a step consisting in regularly determining the Kappa number of the raw paper pulp during said determined period of time of reaction for identifying the stabilization of the Kappa number of the raw paper pulp.

9. The low energy paper pulp production process according to claim 8, wherein the step for regularly determining the Kappa number of the raw paper pulp consists in determining the Kappa number every ten minutes.

10. The low energy paper pulp production process according to claim 7, wherein said determined period of time of reaction is stopped when the Kappa number of the raw paper pulp is stabilized after at least three consecutive determination of the Kappa number of the raw paper pulp.

11. The low energy paper pulp production process according to claim 1, wherein said reflux temperature is in a range of to 80° C. to 100° C.

12. The low energy paper pulp production process according to claim 11, wherein said reaction temperature is equal to 85° C.

13. A low energy production process for producing paper pulp from lignocellulosic biomass, said process comprising the following successive steps:
   a) extracting lignins and hemicellulose from lignocellulosic biomass by putting at least one solid lignocellulosic raw material in a presence of a mixture, composed only of water and of formic acid, at atmospheric pressure and under controlled conditions of reaction temperature between ambient temperature and a reflux temperature of the mixture at atmospheric pressure with a weight ratio of said at least one solid lignocellulosic raw material/liquid mixture comprised between 1/1 and 1/15, and for a determined period of time of reaction depending on a Kappa number of the raw paper pulp;

b) separating, at atmospheric pressure and at said reaction temperature, a solid fraction, constituting raw paper pulp, from an organic phase containing in solution at least the starting formic acid and water mixture, solubilized monomeric and polymeric sugars, lignins; and, washing said raw paper pulp successively in two steps with:

c1) a solution composed of water and of formic acid with a concentration of formic acid in said solution between 80% and 100%, at ambient temperature; and c2) with hot water between 40° C. and 60° C., and wherein a centrifugation step is performed after said second washing step c2) with hot water.

* * * * *